United States Patent [19]

Hagberg

[11] 4,348,830
[45] Sep. 14, 1982

[54] BODY HAVING THROUGH HOLES AND A METHOD FOR MANUFACTURING SAID BODY

[75] Inventor: Carl E. Hagberg, Stockholm, Sweden

[73] Assignee: Intermatch S.A., Nyon, Switzerland

[21] Appl. No.: 948,042

[22] Filed: Oct. 2, 1978

[30] Foreign Application Priority Data

Oct. 17, 1977 [SE] Sweden .................................. 116549

[51] Int. Cl.³ ...................... A63H 33/10; A63H 33/04; B25G 3/28; B25G 3/00
[52] U.S. Cl. ........................................... 46/26; 46/24; 403/282; 403/263
[58] Field of Search .................... 46/29, 25, 26, 23, 16, 46/24, 28, 27, 30, 31; 264/23, 25, 248, 249, 250; 403/282, 334, 263; 16/110 R; 174/97, 72 C

[56] References Cited

U.S. PATENT DOCUMENTS

| | | | |
|---|---|---|---|
| 2,709,318 | 5/1955 | Benjamin | 46/23 |
| 2,843,971 | 7/1958 | Gardellin | 46/29 |
| 3,681,870 | 8/1972 | Alpert | 46/26 |
| 3,821,688 | 6/1974 | Larsile | 174/97 |
| 4,109,398 | 8/1978 | Hida | 46/39 |

FOREIGN PATENT DOCUMENTS

| | | | |
|---|---|---|---|
| 2305066 | 8/1974 | Fed. Rep. of Germany | 46/16 |
| 941847 | 11/1963 | United Kingdom | 46/16 |

*Primary Examiner*—Robert Peshock
*Assistant Examiner*—Michael J. Foycik, Jr.
*Attorney, Agent, or Firm*—Jon M. Lewis

[57] ABSTRACT

This invention discloses improvements to the connecting blocks for a kit for assembling toy-like configurations from blocks and solid sticks.

The blocks are made in at least two pieces which have contacting surfaces. The one of the contacting surfaces is substantially smooth and the other has grooves therein. When assembled the grooves and adjacent surfaces of the two pieces form holes for the sticks to be inserted into.

25 Claims, 8 Drawing Figures

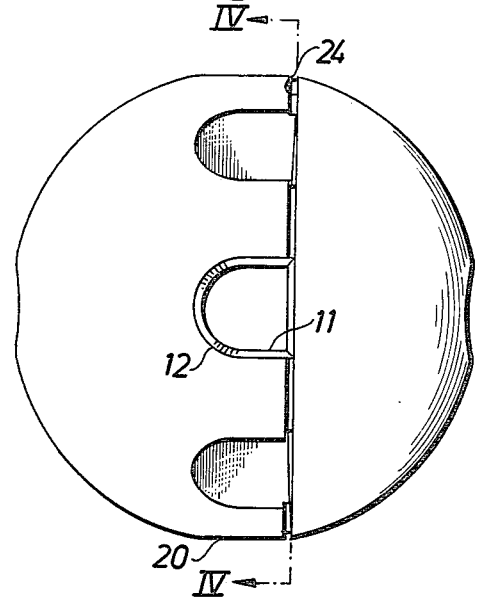
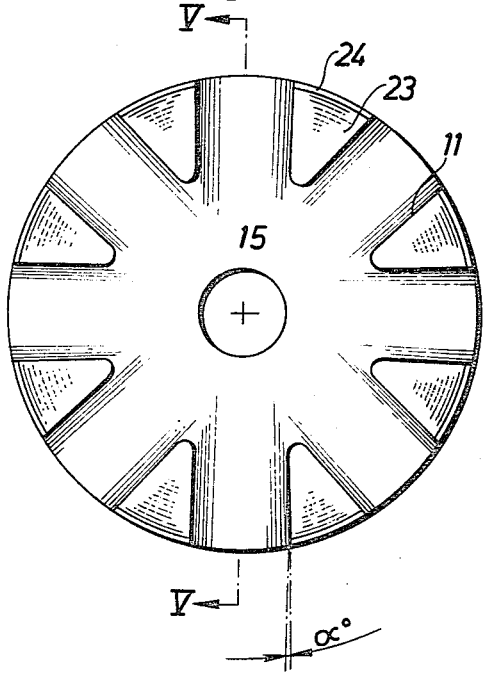

BODY HAVING THROUGH HOLES AND A METHOD FOR MANUFACTURING SAID BODY

BACKGROUND OF THE INVENTION

The invention relates generally to moldable bodies and more particularly to moldable bodies having through-going holes.

DESCRIPTION OF PRIOR ART

In Swedish laid-open application No. 77-03359-5 (Swedish Publication No. 400,901), incorporated herein by reference, which has the same inventor and assignee as the patent application, a kit for assembling light, airy, toy-like designs is disclosed. In the teaching a user assembles a series of blocks having holes which have larger cross-sectional areas at the surface of the associated block than in the interior portion of the hole, which assembly is achieved by inserting connecting elements into the holes and thereby creating an intricate design. The ends of the connecting elements are compressively held in the associated hole by the action of the variation in the cross-section providing force at the points of contact by each hole and its associated connecting element. The ends of the connecting element are preferably deformed by these forces, thereby providing a structure which is relatively strong when subjected to handling.

These blocks having the holes therein as described supra may be mass produced by injection molding. It is clearly known, for example, how to injection-mold plastic component parts and thereafter to join these into a desired body made from the parts of a type determined by the parts. If through-holes are to be present in the body, there must be provisions made in one way or another in the component parts forming the body.

Alternatively, it is theoretically possible to injection-mold in one integral piece the body provided with the through-holes. This, of course, under the prerequisite that the body can be fitted into a mold made of a reasonable number of disassemblable component parts. Such a process requires, however, an even number of mating mold-components; for example, core members. The molds and associated arrangements become, therefore, very complicated, very difficult to use and very expensive to make and maintain.

Therefore, it is preferred to manufacture pieces/component parts separately and then to assemble these into one unit to form the desired object.

However, as soon as the pieces/component parts are to be assembled, the problem immediately manifests itself concerning the orientation of the parts relative one to the other during assembly. If the pieces/component parts are such that the overall appearance of the completed object (for example, a sphere) is not affected by the orientation of the pieces/component parts around a predetermined axis, it would be especially desirable to be able to eliminate the step of orienting the pieces in relationship to one another, which precedes the joining of the pieces/component parts together.

SUMMARY OF THE INVENTION

One aspect of the invention resides in a method of manufacturing a block for a kit for building toy-like configurations, said method comprising the steps of (a) molding a first part having a first surface for making contact with a second part, said first surface being molded substantially even; (b) molding said second part having a second surface for making contact with said first surface, said second surface being molded with at least one groove therein extending from an extreme outer periphery of the second surface towards a central portion of said second surface; said groove having a longitudinal axis extending therealong; (c) aligning said first and second parts as to make contact between said first and second surfaces such as to form a said block; and (d) joining said first and second parts together along the contacting portions of said first and second surfaces. Another aspect of the invention resides in a kit for recreational purposes for the building of at least user-designable objects comprising toy-like configurations having at least one geometrically selectable shape, said kit comprising (a) a plurality of blocks having exterior surfaces, each of said exterior surfaces having at least an extreme outer surface portion; at least one aperture on the extreme outer exterior surface of each of said blocks, said at least one aperture defining a hole, said hole having a substantially central longitudinal axis extending from substantially adjacent said outer surface generally toward said central region, said hole having at least one wall, a portion of said at least one wall adjacent said outer surface having a distance from said central longitudinal axis which is greater than a distance from a corresponding portion of said at least one wall within said central region to a corresponding point on said longitudinal axis also within said central region; and (b) a plurality of elongated elements being formed of substantially the same material throughout and having ends adapted to be insertable into the holes in said blocks at least for interconnecting a selectable portion of said blocks one with the other, whereby a selectable end of each of said elongated elements is compressibly grippable in and by its corresponding hole, the improvement comprising said blocks each having a first part and a second part; said first part having a first contacting surface for making contact with said second part; said second part having a second contacting surface for making contact with said first contacting surface; said first contacting surface being substantially even; said second contacting surface having at least one groove therein, said at least one hole being formed by said groove of said second surface and a portion of said first surface adjacent said at least one groove. The elimination of the step of orienting the pieces one to the other has been achieved in that pieces/component parts are such, that in the contemplated contacting surfaces between adjacent pieces/component parts' one or more grooves, which form the holes, are formed only in one surface.

The underlying principle of this fundamental conceptual design provides, in addition, excellent flexibility.

This is, for example, the case concerning cross-sectional variations of one or more through-holes which are provided along the plane of the surface which make contact one to the other. It is thus feasible to position a number of through-holes such that they intersect at the center of a sphere while making the cross-sectional areas of each and every one of their grooves progressively smaller in the direction of the center.

Even if the present simple molding or injection-molding methods according to the invention prevent the formation of cylindrical or doubly conical through-holes with exactly circular cross-sectionals, the cross-sections are fortunately acceptable for the aforesaid applications in the introduction. In the case of the firststated application, the holes perform their function of gripping very well, even if they have somewhat asymmetrical cross-sections, by satisfactorily deforming and pinching the deformable, elongated connecting elements which are used. As pertaining to the pieces/component parts' case, a partially circular or other partially symmetrical cross-section, in the vast majority of cases, should not detrimentally affect the flow.

It should be emphasized, in this context, that holes having completely symmetrical cross-sections are not in any way excluded by the technology practiced according to the invention. It is, for example, quite possible that a square cross-section can be used if so desired. The obtainable cross-section is dependent to a certain degree on the material which is used in the fabrication of the body. If this material is relatively flexible, the ejection characteristics of the molded object from its mold make it possible to use relatively large negative angles in the hole-forming grooves in the one of the contacting surface. In this case the cross-section may be formed by a circular segment shape with a central angle of greater than 180°.

In one embodiment, along the major surface in which the grooves are formed, the grooves are preferably equally distributed about a centrally located point of intersection and radiate therefrom. Perpendicular to the major contacting surface a number of holes radiate through the centrally located point of intersection and open onto the outer surface of the instant piece/component part. A corresponding hole also is to be found in the other piece/component part. These holes are used as centering holes during the process for joining the pieces/component parts. The joining process can be accomplished by means of ultrasonic welding, induction heating, or similar for plastic materials; for example, polyoleophines, styrene plastics, and especially polystyrene.

BRIEF DESCRIPTION OF THE DRAWINGS

FIG. 3 shows a more detailed side view of the body of FIG. 2.

FIG. 4 shows a cross-sectional view of the part of the body provided with grooves along the line IV—IV of FIG. 3.

DESCRIPTION OF THE PREFERRED EMBODIMENTS

Figure 1:
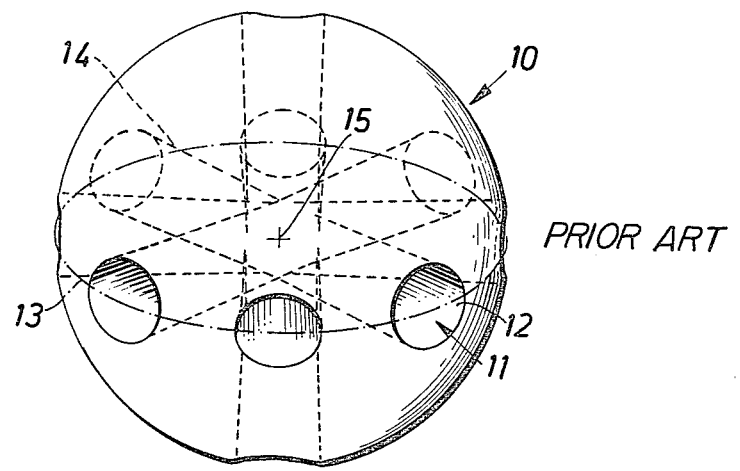
FIG. 1 shows a "modular body" according to Swedish Publication No. 400,901.

In FIG. 1 the numeral 10 is used to generally denote the spherical ball/round body which has in the preferred embodiment a number of through holes 11. These holes have apertures 12 along a great circle 13. As shown by the dashed lines 14 in the figure, the holes extend through the ball's central point 15 and narrow as the hole extends towards this point from the aperatures 12. In FIG. 1 it is envisioned that the holes 11 should have circular cross-sections. As from the introductory comments it should have been evident, such holes create, however, certain problems pertaining to the fabrication thereof.

Figure 2:
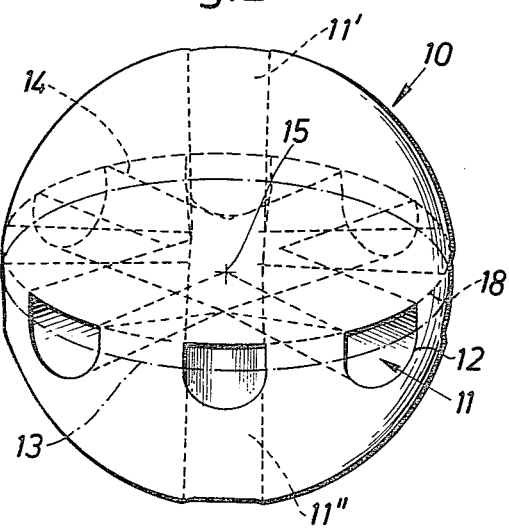
FIG. 2 shows said modular body modified by application of the principle of the present invention.

By the use of the same reference numerals as in FIG. 1, a modified, considerably simplified method of fabricating a substantially spherical ball with a configuration of holes as illustrated in FIG. 1 with an analogous hole configuration, is shown now in FIG. 2. The apertures 12 are here in the same manner as earlier disclosed equally displaced along a great circle 13. The cross-section of the holes is, however, no longer circular, but generally formed by a semicircular section and a rectangular section, such that the instant cross-section becomes generally formed like the shape of a horseshoe.

Figure 5:
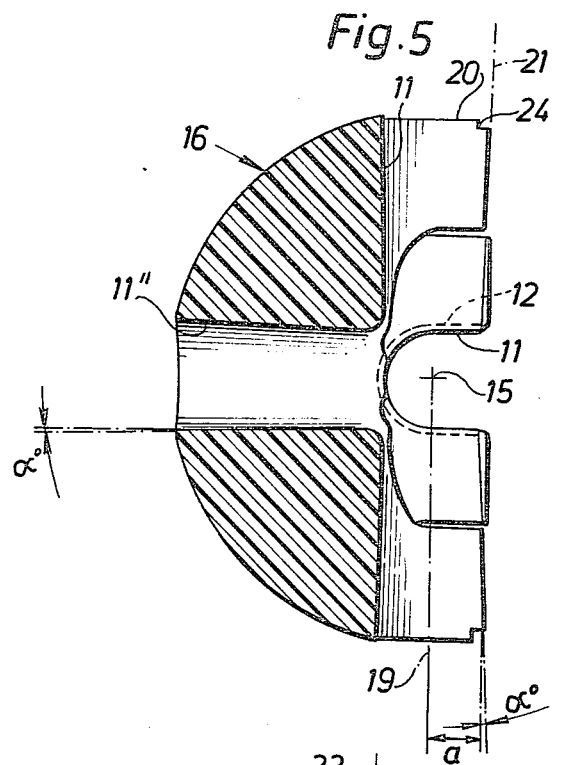
FIG. 5 is a partially sectioned view of the part of FIG. 3 along the line V—V.

As will become more clearly evident from the description in combination with FIGS. 3 through 5, the holes 11 and the apertures 12 are obtained from grooves, having a contour which is in the form of a horseshoe and which have been formed in a first portion of the body or element 16. A second portion or body element 17 has in contrast only one hole 11″ corresponding to a hole 11 in the first embodiment. Thus, in FIG. 2, the elements 16 and 17 have been joined together along the broken line 18.

Before the method of joining is discussed further, it is, however, appropriate to observe the body portions 16 and 17, which comprise the body according to FIG. 3. These portions shall thus each be formed by the injection-molding of a plastic material. In order to satisfy the requirement for ejection from a mold, the portions 16 and 17 have thus been formed in such a manner as shown in FIGS. 5 and 6.

The piece 16 which includes the grooves has a central point 15 shown in FIG. 5. On both sides of the center line 19 of the vertical groove 11 as shown in FIG. 5 there is an exterior linear portion. The body 16 must be injection-moldable and for this purpose the two mating portions of the injection-mold should be able to be disassembled without any greater difficulties after the injection molding has been completed. It is thus understood, that if the parting line of the injection-mold is chosen to be along the line 21 as shown in FIG. 5, this requirement concerning ejection from the mold is satisfied. To make the cross-section of the holes 11 and 11″ decrease in the direction towards the central point 15 does not create any difficulties.

Figure 6:
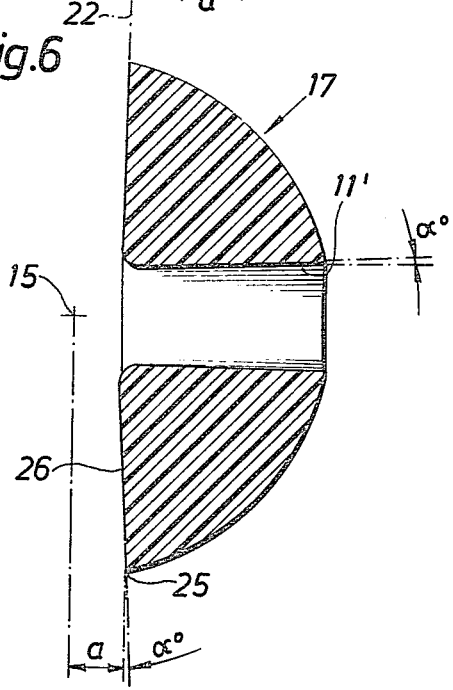
FIG. 6 is a sectional view of the right piece/component part of FIG. 3.

In FIGS. 5 and 6 the decreasing cross-section has been indicated with an angle alpha. This angle can be of the order of magnitude of a few degrees; for example, between 1 to 5 degrees, or larger.

To fabricate the body portions 17 by injection molding does not create any difficulties either. In the tool a parting line is used which corresponds to the dashed line 22 in FIG. 6. In the same manner as in FIG. 5, the hole 11′ is obtained with the aid of a stationary core member in the part of the injection-mold which would be to the right of the parting line 22 (during the molding operation). In contrast, concerning the grooves 11 which make holes as shown in FIG. 5, these are obtained with the aid of ribs or pins situated in the right of the injection-mold which (in operation) is to the left of the line 21. In considering that the linear portions 20 do not provide any problems with the opening of the two portions of the mold, in certain cases it is even possible to eliminate such linear portions and to make even these portions partially circular in form. This is possible to a great degree, and to a great degree dependent on the elasticity of the injection-molded material; the more elastic it is, the greater the negative angle; that is to say, the increase in the circular cross-section can be accepted. The body portion 17 in FIG. 6 has the same radius as that on the body portion 16. The center of curvature for the body portion 17 has also been denoted by the reference numeral 15. This is done because the two central points in the portions 16, 17 will be superimposed when the body portions are joined together. The distance denoted by the letter (A) in FIG. 6 corresponds thus to the distance (a) in FIG. 5.

In the approximately triangular portions 23 between the holes 11 in the body portion 16 shoulders 24 have been formed. These shoulders cooperate in assembly. Such that body portion 17 is gripped around the edge 25 and conveyed into direct intimate contact with the slightly conical surface 26 in the complimentary conical surfaces of the triangular portions 23.

The only centering, which is thereby required is a centering of the holes 11' and 11". This is done simply by inserting a centering pin through these holes. As soon as the portions 16 and 17 are conveyed into intimate contact with one another by means of the centering pin, the halves are ready to be joined together. This joining can be done with the aid of ultrasonic welding, inductive welding, or by some other appropriate means.

Figure 7:
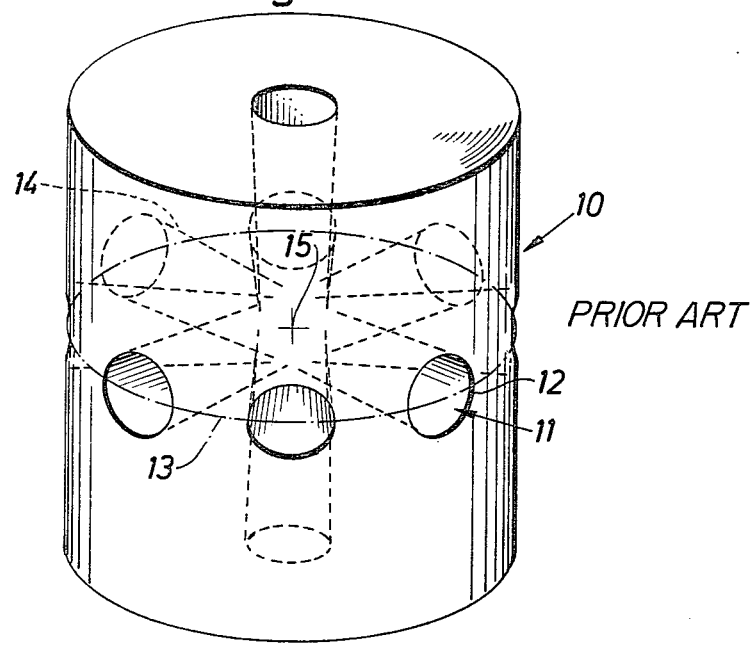
FIGS. 7 and 8 are analogous configurations of FIGS. 1 and 2 and have a view towards illustrating the application of the concept of the invention in a cylindrical body.
Figure 8:
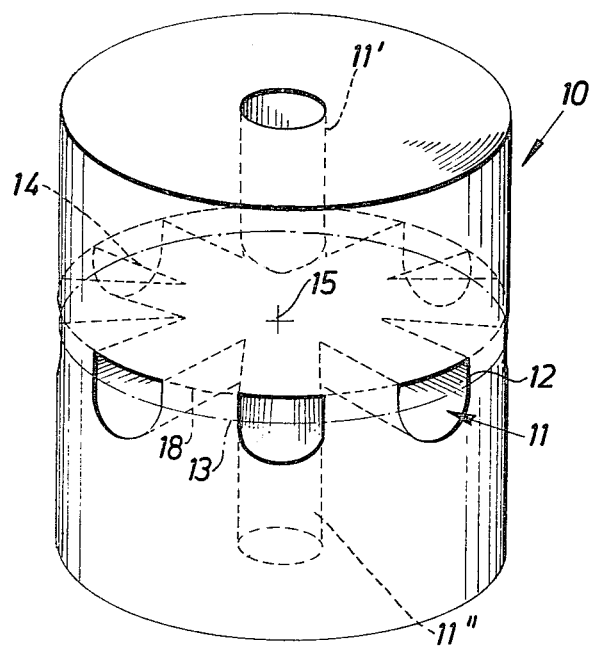
Figure 9:
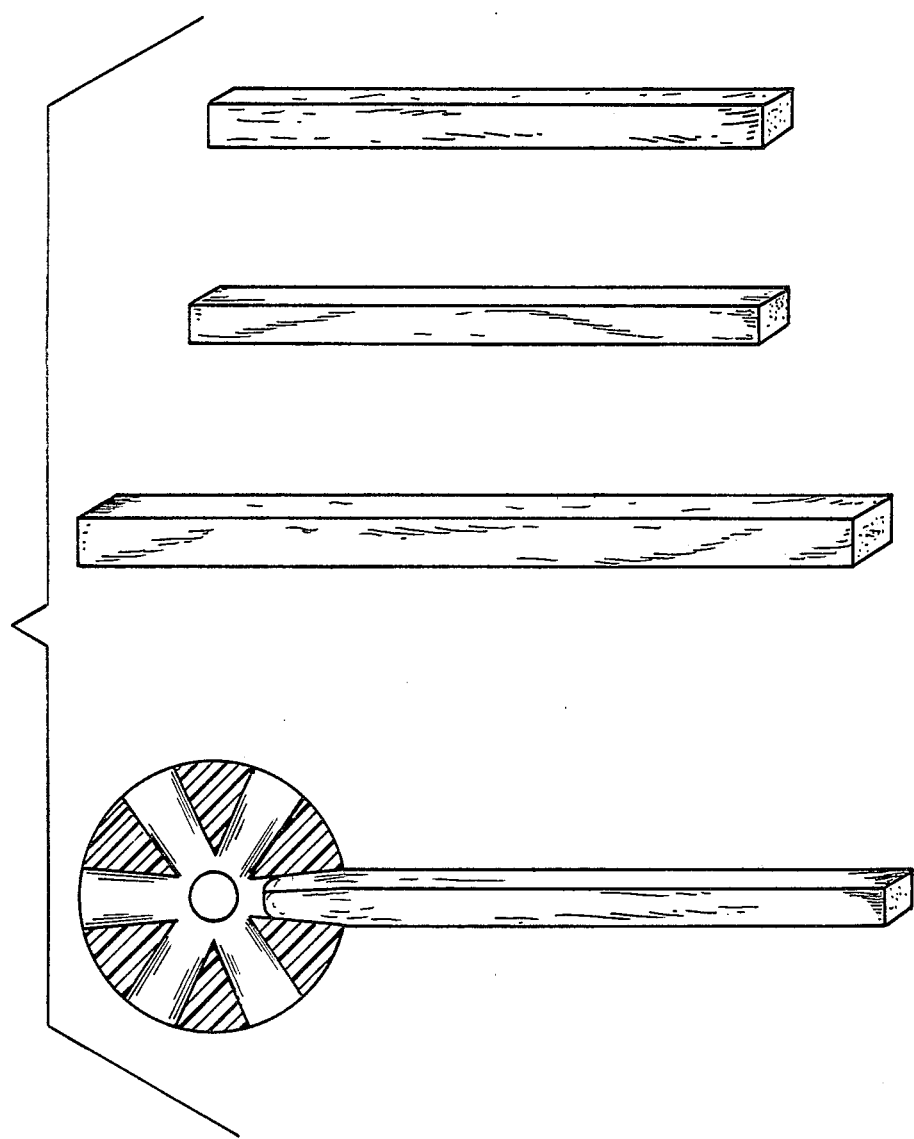
FIG. 9 is an illustration of longitudinal elements or sticks and how they can be employed in our invention to connect modular bodies of FIG. 2.

In order to demonstrate that the concept of the invention is applicable even to basic geometric forms other than spherical ones, a cylindrical embodiment is shown in FIGS. 7 and 8, where the same reference numerals as in FIGS. 1 and 2 are to be found. Other basic geometric configurations of the included geometrical forms or bodies are certainly conceivable and the object of both of the exemplary embodiments is solely to more exactly illustrate the concept of the invention as defined by the claims.

What is claimed is:

1. A kit for building toy-like configurations having at least one selectable geometrical shape, said kit comprising:
   (a) a plurality of blocks having exterior surfaces, each of said exterior surfaces having at least an extreme outer surface portion, a central inner region circumscribed by said extreme outer surface portion; at least one aperture on the extreme outer exterior surface of each of said blocks, said at least one aperture defining a hole, said hole having a substantially central longitudinal axis extending from substantially adjacent said outer surface generally toward said central inner region, said hole having a progressive variation in cross-sectional area along said longitudinal axis, the variation resulting in the cross-sectional area being greater adjacent said outer surface and smaller towards said central region; and
   (b) plurality of disposable elongated elements being formed of substantially a deformable material and having ends which have a cross section adapted to be insertable into the holes in said blocks at least for interconnecting a selectable portion of said blocks one with the other, said elongated elements having ends with sectional profile dissimilar as compared with the sectional profile of a said hole such that a selectable end of each of said elongated elements in assembly is compressibly grippable by material deformation in and by its corresponding hole at one of at least several locations along said portion of decreasing cross-sectional area of the hole, said blocks each having a first part and a second part; said first part having a first contacting surface for making contact with said second part; said second part having a second contacting surface for making contact with said first contacting surface; said first contacting surface being substantially smooth; said second contacting surface having at least one groove therein, said at least one hole being formed in assembly by said groove of said second surface and a portion of said first surface adjacent said at least one groove.

2. The kit for building toy-like configurations according to claim 1 wherein said at least one groove has substantially planar straight side walls in the direction of said longitudinal axis.

3. The kit for building toy-like configurations according to claim 2 wherein the configuration of said at least one groove comprises a circular surface portion and a flat surface portion.

4. The kit for building toy-like configuration according to claim 3 wherein the circular portion of said groove comprises a segment of a circle, said segment having a predetermined central angle.

5. The kit for building toy-like configurations according to claim 4 wherein said predetermined central angle is less than 180°.

6. The kit for building toy-like configurations according to claim 4 wherein said predetermined angle is greater than 180°.

7. The kit for building toy-like configurations according to claim 1 including a plurality of grooves intersecting at said central inner region of said block and intersecting one another at substantially equal angles, said plurality of grooves forming in assembly a plurality of holes.

8. The kit for building toy-like configurations according to claim 2 including a plurality of grooves intersecting at said central inner region of said block and intersecting one another at substantially equal angles, said plurality of grooves forming in assembly a plurality of holes.

9. The kit for building toy-like configurations according to claim 3 including a plurality of grooves intersecting at said central inner region of said block and intersecting one another at substantially equal angles, said plurality of grooves forming in assembly a plurality of holes.

10. The kit for building toy-like configurations according to claim 4 including a plurality of grooves intersecting at said central inner region of said block and intersecting one another at substantially equal angles, said plurality of grooves forming in assembly a plurality of holes.

11. The kit for building toy-like configurations according to claim 7 wherein on assembly at least some assembled blocks each form a substantially spherical ball wherein said grooves are spaced substantially radially and uniformly along said second contacting surface of the second part of each spherical ball.

12. The kit for building toy-like configurations according to claim 11 including at least one additional through-hole extending in assembly through the spherical ball, for facilitating assembly said first and second parts.

13. A kit for recreational purposes for the building of at least user-designable objects comprising toy-like configurations having at least one selectable geometrical shape, said kit comprising:

(a) a plurality of blocks having exterior surfaces, each of said exterior surfaces having at least an extreme outer surface portion, a central inner region circumscribed by said extreme outer surface portion; at least one aperture on the extreme outer exterior surface of each of said blocks, said at least one aperture defining a hole, said hole having a substantially central longitudinal axis extending from substantially central longitudinal axis extending from substantially adjacent said outer surface generally toward said central inner region, said hole generally having a cross-sectional area which is greater at said outer surface relative to the hole cross-sectional area at said central inner region, said cross-sectional area progressively decreasing over a length of the hole; and;

(b) a plurality of elongated elements being formed of substantially a deformable material and having ends which have a cross-section adapted to be insertable into the holes in said blocks at least for interconnecting a selectable portion of said blocks one with the other, said hole having such a profile with respect to said cross-section of the elongated elements that a selectable end of each of said elongated elements in assembly is compressibly grippable by deformation in and by its corresponding hole at one of at least several locations along said portion of decreasing cross-sectional area of the hole, each of at least some said plurality of blocks comprising a first part and a substantially similarly shaped but nonidentical second part assembled to form each of at least some of the blocks; said first part having a first contacting surface for making contact with said second part; said second part having a second contacting surface for making contact with said first contacting surface; said first contacting surface being substantially smooth; said second contacting surface having at least one groove therein, said at least one hole being formed in assembly by said groove of said second surface and a portion of said first surface adjacent said at least one groove, said first and second parts further having a through hole in each, which through holes facilitate assembly of said first and second parts.

14. The kit for recreational purposes according to claim 13 wherein said at least one groove has substantially straight side walls generally in the direction of said longitudinal axis of said one groove.

15. The kit for recreational purposes according to claim 14 wherein the configuration of said at least one groove comprises a circular surface portion and a flat surface portion.

16. The kit for recreational purposes according to claim 15 wherein the circular portion of said groove is a segment of a circle, said segment having a predetermined central angle.

17. The kit for recreational purposes according to claim 16 wherein said predetermined central angle is less than 180°.

18. The kit for recreational purposes according to claim 16 wherein said predetermined central angle is greater than 180°.

19. The kit for recreational purposes according to claim 13 including a plurality of grooves intersecting at said central inner region of each said block and intersecting one another at substantially equal angles.

20. The kit for recreational purposes according to claim 14 including a plurality of grooves intersecting at said central inner region of each said block and intersecting one another at substantially equal angles.

21. The kit for recreational purposes according to claim 15 including a plurality of grooves intersecting at said central inner region of each said block and intersecting one another at substantially equal angles.

22. The kit for recreational purposes according to claim 16 including a plurality of grooves intersecting at said central inner region of each said block and intersecting one another at substantially equal angles.

23. The kit for recreational purposes according to claim 19 wherein on assembly, at least some assembled blocks each form a substantially spherical ball wherein said grooves are spaced uniformly radially along said second contacting surface of the second part of each spherical ball.

24. The kit for recreational purposes according to claim 23 including at least one additional through-hole extending in assembly through the spherical ball.

25. A connecting body for connecting deformable elongated elements, for use in toy kits, said body comprising at least two parts which are substantially similar in shape but are nonidentical, said two parts being assembled by permanently joining them, a first of said parts having a first surface for making contact with a second of said parts,
   a second of said parts having a second surface for making contact on assembly with said first surface of said first part,
   said second surface having a portion with at least one groove therein for accepting, upon assembly of the kit, one end of a said deformable elongated element, the groove being wider at an outer periphery of the second surface and narrowing towards a center region of the second surface,
   a portion of said first surface upon assembly adjacent said one groove being substantially complementary with said one groove to form a hole which is progressively tapering over its length for accepting, upon assembly of the kit, an end of an elongated element by compressible deformation, said hole having such a tapering cross-sectional profile with respect to the cross section of the elongated elements that a selectable end of each of said elongated deformable elements in assembly is compressively grippable at one of at least several locations along said tapering hole.

* * * * *